(12) United States Patent
Chiu et al.

(10) Patent No.: US 9,965,197 B2
(45) Date of Patent: May 8, 2018

(54) SYSTEM AND METHOD FOR STORAGE AREA NETWORK MANAGEMENT USING SERIAL ATTACHED SCSI EXPANDER

(71) Applicant: Quanta Computer Inc., Taoyuan (TW)

(72) Inventors: Yang-Li Chiu, Taoyuan (TW); Tsu-Tai Kung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 359 days.

(21) Appl. No.: 14/969,554

(22) Filed: Dec. 15, 2015

(65) Prior Publication Data
US 2017/0168730 A1   Jun. 15, 2017

(51) Int. Cl.
| G06F 13/38 | (2006.01) |
| G06F 13/42 | (2006.01) |
| G06F 3/06  | (2006.01) |
| G06F 13/40 | (2006.01) |

(52) U.S. Cl.
CPC ............ *G06F 3/0613* (2013.01); *G06F 3/067* (2013.01); *G06F 3/0665* (2013.01); *G06F 13/4068* (2013.01); *G06F 13/4282* (2013.01)

(58) Field of Classification Search
CPC .. G06F 13/0653; G06F 13/385; G06F 13/463; G06F 13/42
USPC ......................................................... 710/300
See application file for complete search history.

(56) References Cited

U.S. PATENT DOCUMENTS

| 2006/0168189 A1* | 7/2006 | Huang ............. H04L 67/125 709/223 |
| 2007/0061439 A1* | 3/2007 | Pope ................. H04L 29/06 709/223 |
| 2007/0086449 A1* | 4/2007 | Huang ............... H04L 41/00 370/389 |
| 2007/0088974 A1* | 4/2007 | Chandwani ....... G06F 11/0781 714/6.11 |
| 2007/0174517 A1* | 7/2007 | Robillard .......... G06F 3/0617 710/62 |
| 2007/0214303 A1* | 9/2007 | Bashford .......... G06F 13/385 710/314 |
| 2008/0120687 A1* | 5/2008 | Johnson ........... G06F 21/6218 726/1 |
| 2008/0126851 A1* | 5/2008 | Zadigian .......... G06F 11/2092 714/6.32 |
| 2010/0299549 A1* | 11/2010 | Day ................. G06F 1/3221 713/340 |
| 2011/0191644 A1* | 8/2011 | Oldfield ............ G06F 11/00 714/704 |
| 2012/0239843 A1* | 9/2012 | Khanvilkar ........ G06F 3/0605 710/300 |
| 2013/0254361 A1* | 9/2013 | Liu ................. H04L 41/0806 709/223 |
| 2016/0072642 A1* | 3/2016 | Shih ................ H04L 12/4666 370/392 |

* cited by examiner

*Primary Examiner* — Christopher Shin
(74) *Attorney, Agent, or Firm* — Nixon Peabody LLP; Eduardo J. Quinones; Zhou Lu

(57) ABSTRACT

This disclosure generally relate to remote management of a storage system. The present technology relates techniques that enable a new function of a SAS expander to provide scalable and efficient SAN management. By enabling a direct and separate interface for each storage system associated with a SAS expander, the present technology can achieve SAN management with improved efficiency.

20 Claims, 7 Drawing Sheets

SYSTEM AND METHOD FOR STORAGE AREA NETWORK MANAGEMENT USING SERIAL ATTACHED SCSI EXPANDER

FIELD OF THE INVENTION

The disclosure relates generally to remote management of a storage system. More specifically, certain embodiments of the technology relate to a method and system for remote management of storage devices using a serial attached small computer system interface (SAS) expander.

BACKGROUND

Storage Area Networks (SANs) provide an important data storage solution for modern data centers. SANs are primarily used to enhance storage devices accessibility to servers so that the devices appear like locally attached devices to the operating system. Examples of the storage devices include Redundant Array of Independent Disks (RAID) and disk arrays such as SAN arrays. By providing block-level storage that can be accessed by any networked servers, SANs provide a consolidated data storage while offering increased system performance.

SANs also offer excellent capacities for data backup and disaster recovery. Because data can be transferred between storage devices without interacting with a server, a SAN can accelerate the data backup process and conserve the processing power of the server Central Processing Unit (CPU).

Among various protocols that enable SANs, serial attached small computer system interface (SAS) offers point-to-point serial connections with high-throughput data communication. A SAS expander, similar to a switch, connects host devices such as host bus adaptors (HBAs) and target storage devices such as hard disk drives (HDDs).

SUMMARY

Aspects of the present technology relate to techniques that enable a novel function of a SAS expander to provide scalable and efficient SAN management. By enabling a direct and independent interface for each storage system associated with a SAS expander, the present technology can achieve SAN management with improved efficiency.

In accordance with one aspect of the present disclosure, a computer-implemented method is provided. The method includes establishing a remote management control protocol (RMCP) session configured to transmit data between the SAS expander and a remote management device at a SAS expander, receiving a RMCP status request for at least one storage device associated with the SAS expander via a network interface of the SAS expander, receiving status data related to the at least one storage device of the plurality of storage devices via a serial peripheral interface of the SAS expander, configuring a RMCP status response based at least in part on the status data related to the at least one storage device using an intelligent platform management interface (IPMI) agent executing on the SAS expander, and transmitting the RMCP status response to the remote management device via the Ethernet interface of the SAS expander.

In accordance with another aspect of the present disclosure, a non-transitory computer-readable storage medium storing instructions is provided, the instructions which, when executed by a service controller, cause the service controller to perform operations including: establishing a remote management control protocol (RMCP) session configured to transmit data between the SAS expander and a remote management device at a SAS expander associated with a plurality of storage devices, receiving, via a serial peripheral interface of the SAS expander, status data related to the at least one storage device of the plurality of storage devices, the status data comprising at least one of temperature data, power data, and fan speed data of the at least one device, configuring a RMCP status message based at least in part on the status data related to the at least one storage device using an IPMI agent; and transmitting the RMCP status message to the remote management device via an Ethernet interface.

According to some embodiments, the present technology can enable a network-based management of SANs using network interfaces implemented by SAS expanders. The network-based management of SANs can further improve server scalability and flexibility as servers can be managed over a network at a centralized location, e.g., by a server management device. For example, using the network-based management of SANs, the administrator does not need to physically connect to each SAN for status monitoring. Additionally, by collecting status data from each individual and localized SAS expander, some embodiments of the present technology can enable an efficient and prompt system monitoring mechanism for a large number of SANs.

Although many of the examples herein are described with reference to the SAS protocol, it should be understood that these are only examples and the present technology is not limited in this regard. Rather, any protocols that provide communication connections for SANs may be used, such as Fibre Channel protocol, ATA over Ethernet, or the like.

Additionally, even though the present discussion uses a SAS expander as an example of a status-monitoring device, the present technology is applicable to other controller that is independent from the main CPU and operation system.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

The SAS protocol provides point-to-point connections that enable servers and storage devices to communicate with each other through high-speed serial physical communications. Point-to-point connections not only improves data throughput but also provides diagnosis efficiency at a disk failure. A typical SAS system uses SAS expanders to provide the switching and routing functions among the SAS devices.

To implement out-of-band management of the SAS-connected storage devices, a SAS expander replies on a Baseboard Management Controller (BMC) for data communications. A BMC can be responsible for the managing and monitoring of the main central processing unit and peripheral devices on the motherboard. For example, a BMC can communicate with other internal computing components via Intelligent Platform Management Interface (IPMI) messages. A BMC can communicate with external computing devices using Remote Management Control Protocol (RMCP). Alternatively, a BMC can communicate with external devices using RMCP+ for IPMI over LAN.

However, configuring a BMC to provide status data of the storage devices can be time consuming and challenging, which creates a hurdle for efficient SAN management in large-scale data centers.

Thus, there is a need to improve out-of-band management for SANs by providing a novel communication mechanism that offers improved performance, scalability and reliability.

The present technology discloses techniques that can enable direct out-of-band management by configuring a SAS expander to support IPMI messages. According to some embodiments, a SAS expander can receive status data of the storage system from various sensors via a serial peripheral interface interface, e.g., SAS or SATA. The SAS expander can configure a RMCP status message pursuant to the IPMI protocol and transmit it to a remote management system via the Ethernet.

The IPMI protocol, with its independent power, firmware, and operation system, defines an interface used by the system administrator for out-of-band management of computer systems. For example, IPMI provides a mechanism to manage a server when the main CPU is off or unavailable.

Figure 1:
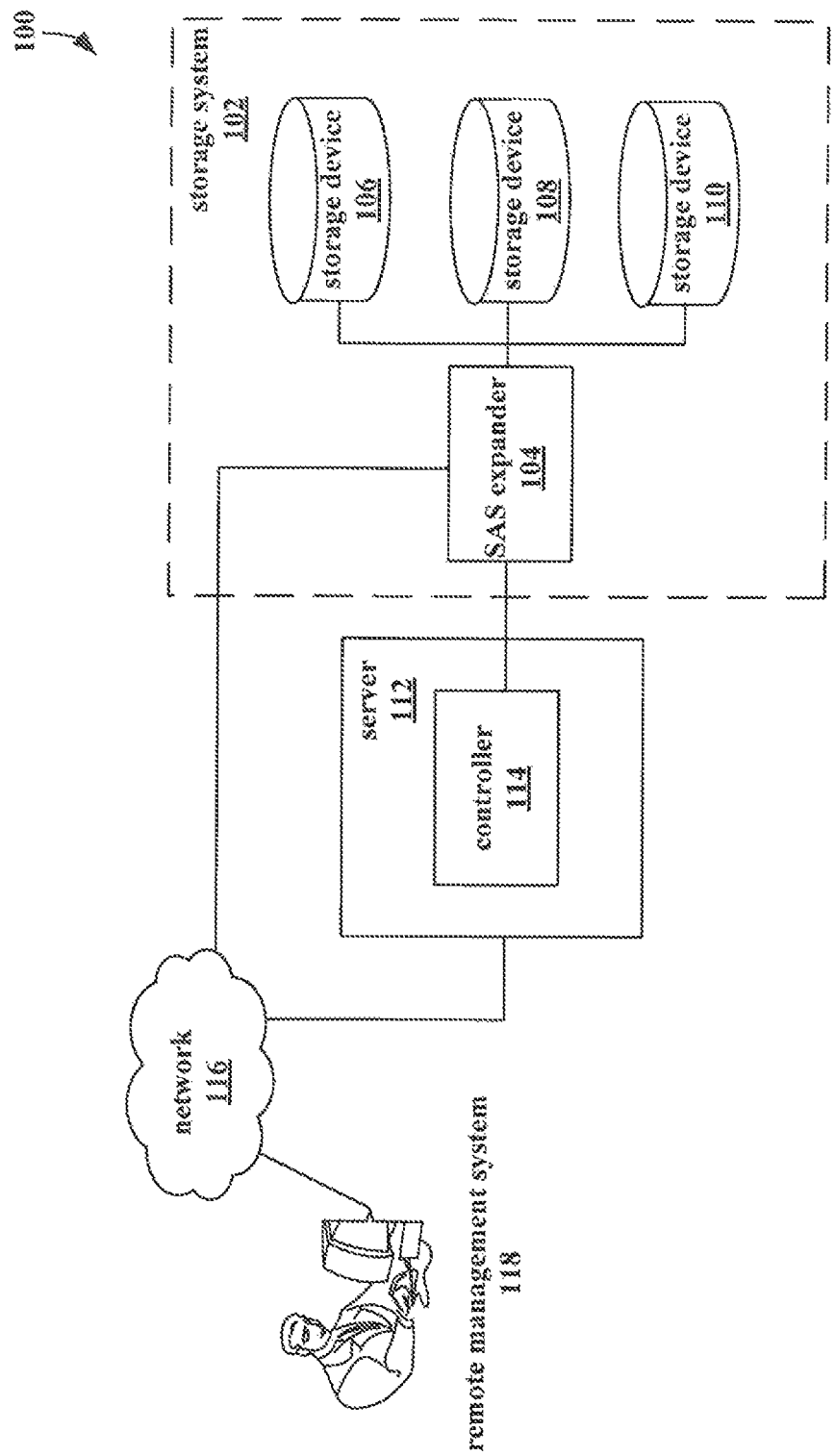
FIG. 1 illustrates an overall SAS expander management system diagram, according to some embodiments.

FIG. 1 illustrates an overall SAS expander management system diagram, according to some embodiments. It should be appreciated that the system topology in FIG. 1 is an example, and any numbers of computing devices such as servers, storage devices, controllers, SAS expanders and network components may be included in the system of FIG. 1.

A SAS expander management system 100 includes a SAN such as a storage system 102, server 112, network 116 and remote management system 118. Server 112 can be any suitable hosting device that is associated with one or more storage systems, each of which further includes at least one SAS expander and a number of storage devices.

Server 112 can include controller 114, e.g., a SAS RAID controller, for initiating requests and managing communication with target devices. Another example of controller 114 is a satellite controller, e.g., a baseboard service controller (BMC). Controller 114 is operable to handle user data and system data between server 112 and storage devices such as storage device 106, 108 or 110. For example, Controller 114 can issue I/O commands to storage device 106. Further, controller 114 can be an on-board component on the motherboard or an add-on host bus adaptor (HBA).

A SAS expander 104, coupled to controller 114, can increase the number of SAS storage devices as well as the complexity of a SAS topology. SAS expander 104 facilitates communication between large numbers of SAS devices. SAS expander 104 can be an edge expander that allows for communication with up to 255 SAS addresses, facilitating a SAS initiator to communicate with these additional SAS devices. SAS expander 104 can also be a fanout expander that can connect up to 255 sets of edge expanders.

SAS expander 104 can, via external expander-ports, connect to a number of storage devices, e.g., storage device 106, 108 and 110. Storage device 106 can be any storage medium configured to store program instructions or data for a period of time. For example, it can be a solid state drive (SSD), a hard drive disk (HDD), a flash drive, or a combination thereof. Storage device 106 can, for example, include a logical unit number (LUN) to identify a logical unit of the storage device. For example, storage device 106 can include LUN 0, LUN 1, LUN 2 and LUN 3, each of which is a respective logical unit. According to some embodiments, Storage device 106 can use other identifiers such as a unique SAS address to uniquely identify each respective storage unit.

As the SAS architecture allows interoperability between both SAS drives and serial advanced technology attachment (SATA) drives, it offers great storage flexibility. Accordingly, storage device 106 can communicate with SAS expander 104 via either a SAS interface or a SATA interface.

Additionally, storage system 102 includes one or more SAS expanders and connected storage devices. According to some embodiments, storage system 102 can be housed in a storage enclosure, such as in a "just a bunch of disks" (JBOD) system.

Using remote management system 118, a system administrator can connect to server 112, via network 116 for monitoring operation status of storage system 102. Network 116 can be a LAN, a wide area network (WAN), an Internet, or a combination thereof. Remote management system 118 can be any suitable computing device configured to manage the operation status of a computing system. Examples of remote management system 118 can be a personal computer, a tablet, a laptop computer, or the like. Remote management system 118 includes a network interface controller (NIC) for implementing a network interface. As further described in the following specification, remote management system 118 can directly connect to storage system 102, via network 116. Remote management system 118 can communicate with SAS expander 104, via IPMI messages. By supporting TCP/IP protocols, SAS expander 104 can provide an Ethernet interface to communicate with remote management system 118 for out-of-band system management.

According to some embodiments, SAS expander 104 can execute an IPMI agent to collect comprehensive status data from related storage devices. An IPMI agent include program instructions, when executed, can perform various data transmission functions such as collecting sorting, and transmitting data reflecting the physical status of a storage system. Typical status data includes temperature data of the CPU and chassis, fan speed data, system voltage data, state data of the physical disk and LED status data.

As illustrated in FIG. 1, by directly collecting status data from each individual and localized SAS expander, some embodiments of the present technology can enable an efficient and prompt system monitoring mechanism for a large number of storage systems, each of which is associated with an independent SAS expander and a group of storage devices.

Figure 2:
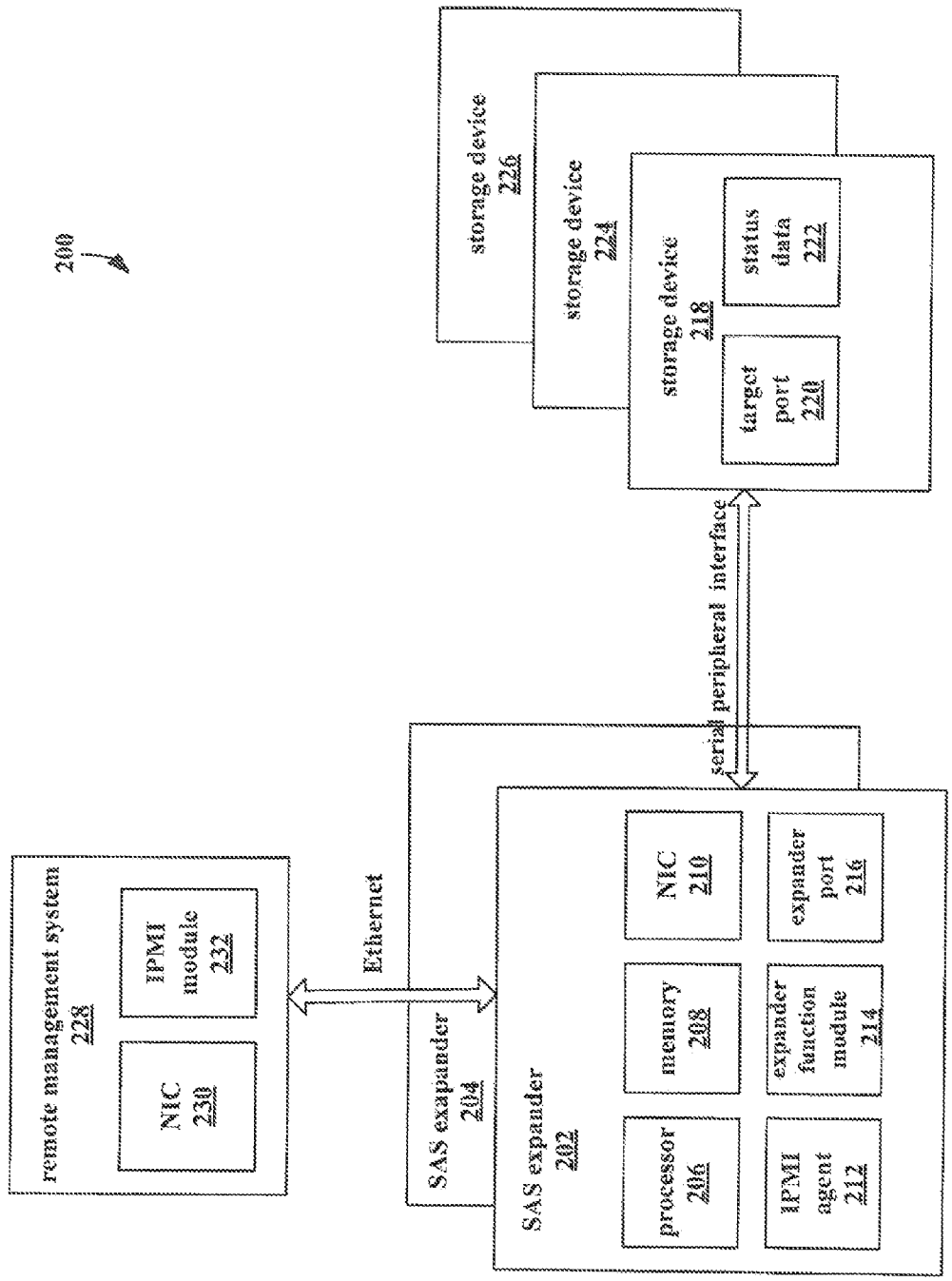
FIG. 2 is a schematic block diagram illustrating an example of a SAS expander management system, according to some embodiments.

FIG. 2 is a schematic block diagram illustrating an example of a SAS expander management system 200, according to some embodiments. SAS expander management system 200 can include a plurality of SAS expanders, e.g., SAS expanders 202 and 204, each of which is connected to one or more storage devices, e.g., storage device 218, storage device 224 and storage device 226.

SAS expander 202 can include, for example, processor 206, memory 208, NIC 210, IPMI agent 212, expander function module 214 and expander port 216. Processor 206 can be a central processing unit (CPU) configured to execute program instructions for specific functions. For example, during a data-collection process, Processor 206 can execute IPMI agent 212 to initialize and perform the data transmission.

Memory 208 can be any storage medium that is operable to store data for a period of time. For example, Memory 208 can include read only memory (ROM), random access memory (RAM), registers or a combination thereof. Memory 208 can store routing tables for packet switching. For example, memory 208 can also store IPMI agent 212.

IPMI agent 212 includes program instructions that are operable to collect, sort and transmit data reflecting the physical status of a storage system using IPMI protocol, IPMI protocol enables out-of-band data communication for an autonomous computer subsystem. For example, IPMI agent 212, upon receiving temperature data related to a storage device, can determine that the storage device has over-heated based at least in part on preferred operation temperature data stored in a database. Accordingly, IPMI agent can send an IPMI message to remote management system 228 for reporting the over-heating at the storage device. Consequently, an administrator can, for example, configure to increase a fan speed related to the over-heated storage device.

According to some embodiments, status data includes, for example, temperature data of the CPU and chassis, fan speed data, system voltage data, state data of the physical disk and LED status data. Additionally, various sensors, e.g., thermometers or power meters, which are installed within an enclosure, can be used to collect the status data.

Further, status data 222 can include any status data related to storage device 218. Status data 222 can include a database that stores historical physical data. Status data 222 can be dynamic and real-time as various sensors can continuously provide data related to storage device. According to some embodiments, a storage device controller (not shown) can process the status data so that it can be transmitted to SAS expander.

Expander function module 214 can include program instructions operable to initiate and execute switching functions of SAS expander 202. Expander function module 214 can include one or more application program interface (API) modules operable to interact with each other for data retrieving, verifying and transmitting. For example, expander function module 214 can include an IPMI service API, a storage service API, a SAS controller API, or a satellite controller API, each of which is operable to execute on SAS expander 202. Expander function module 214 is operable to receive packets from an initiator device such as a server to be sent to a target device such as a storage device. By identifying a destination address in the received packets, expander function module 214 is operable to forward the packets to the target device. Additionally, routing tables can be used to determine whether the packet forwarding should be allowed or denied.

SAS expander 202 can include a number of expander ports such as expander port 216. Expander port 216 can include an expander physical link (PHY, not shown) to implement different layers of IPMI protocol. For example, expander port 216 can connect to target port 220 associated with storage device 218 via corresponding SAS connectors.

Storage device 218 can be a solid state drive (SSD), a hard drive disk (HDD), a flash drive, or a combination thereof. According to some embodiments, Storage device 218 can be identified using a unique SAS address. Further, storage device 218 can be a SAS drive or a SATA drive. Accordingly, storage device 218 can communicate with SAS expander 202 via various serial peripheral interfaces, e.g., a SAS interface or a SATA interface. For example, storage device 218 can communicate with SAS expander 202 via a SAS interface, whereas storage device 224 can communicate with SAS expander 202 via a SATA interface.

Remote management system 228 can be any suitable computing device that is operable to manage operational status of a server. As shown in FIG. 2, remote management system 228 can establish an Ethernet connection with SAS expander 202. The Ethernet connection is implemented by NIC 230 of remote management system 228 and NIC 210 of SAS expander 202.

IPMI module 232 includes suitable program instructions operable to perform various data transmission functions between remote management system 228 and SAS expander 202. For example, IPMI module 232 can send a RMCP session request to SAS expander 202 via the Ethernet interface. Consequently, IPMI module 232 can establish a RMCP session with SAS expander 202 upon receiving a RMCP session response. Using the established RMCP session response, IPMI module 232 is operable to receive a RMCP status response which includes status data related to one or more storage devices.

According to some embodiments, IPMI module 232 is operable to receive status data without initiating a RMCP session. For example, SAS expander 202 can autonomously collect status data of storage device 218, configure a RMCP status message based at least in part on the status data, and transmit the RMCP status message to IPMI module 232 via the Ethernet interface.

Figure 3:
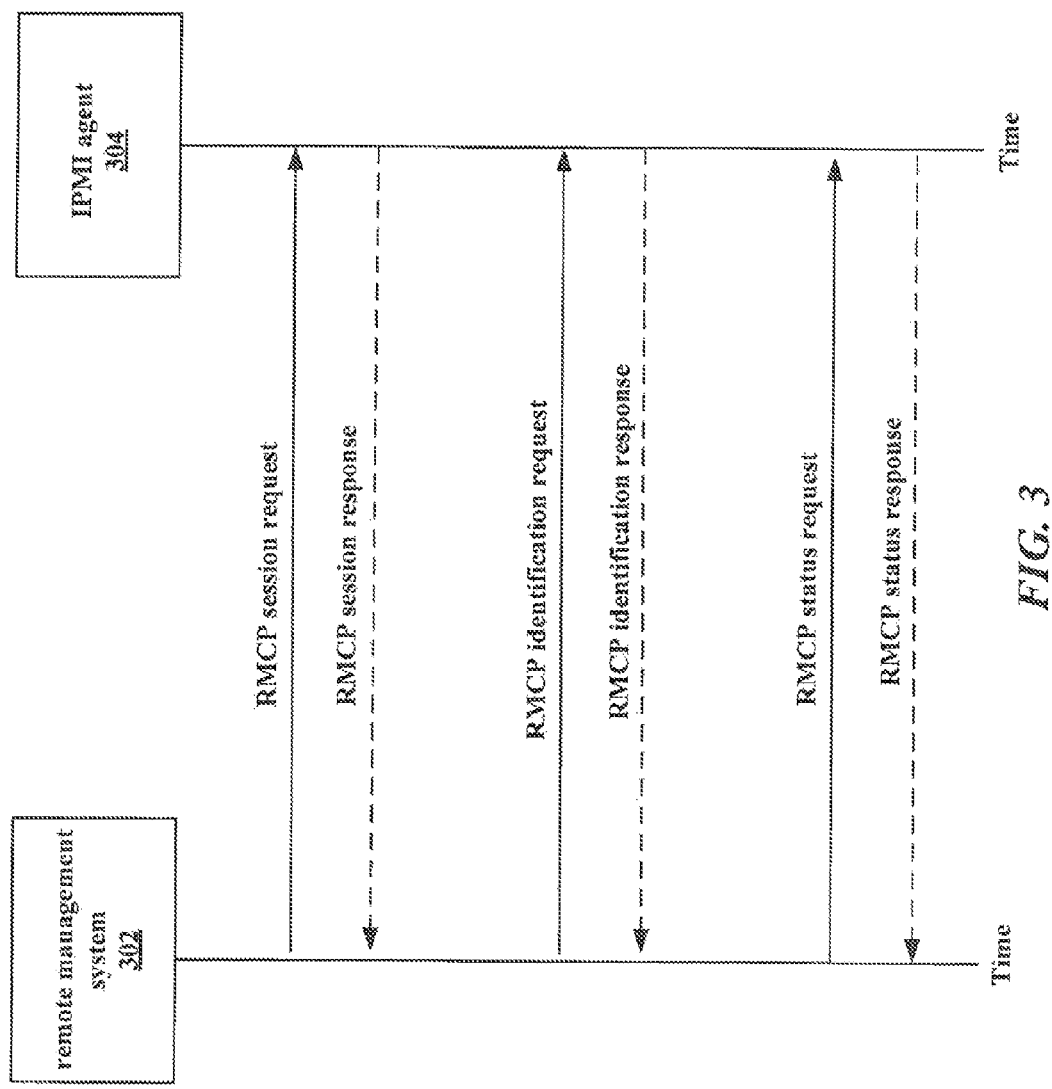
FIG. 3 is a flow diagram illustrating an example of a SAS expander management system, according to some embodiments.

FIG. 3 is a flow diagram illustrating an example of a SAS expander management system, according to some embodiments. It should be understood that there can be additional, fewer, or alternative steps performed in similar or alternative orders, or in parallel, within the scope of the various embodiments unless otherwise stated.

According to some embodiments, remote management system 302 can initiate a RMCP session with IPMI agent 304 that is executed on a SAS expander. For example, an IPMI module is operable to issue a RMCP session request that conforms to the session request format specified for the IPMI protocol, e.g., a RMCP ping message. Using the IPMI protocol, the RMCP session request can be transmitted to IPMI agent 304 via an Ethernet interface.

Upon receiving the RMCP session request, IMPI agent 304 is operable to verify whether the session should be allowed or denied, by, for example, by verifying identification data included in the RMCP session request. Consequently, IPMI agent 304 or its corresponding SAS expander can send a RMCP response to either allow or deny the session request. Similarly, the RMCP session response can conform to the session response format pursuant to the IPMI protocol, e.g., a RMCP pong message.

When a RMCP session is successfully established, remote management system 302 can further execute an authentication process. For example, remote management system 302, by executing an IPMI module, can send a RMCP identification request to IPMI agent 304, for specifying a level of authentication associated with the established session, e.g., using a set privilege level request. Accordingly, IPMI agent 304 can respond with a RMCP identification response through which a maximum privilege level of the session can be specified, e.g., using a set privilege level response. For example, IPMI agent 304 or its associated SAS expander can generate a RMCP identification response to provide information related to authentication algorithms for providing the requested maximum privilege level.

Additionally, remote management system 302 can assign and deliver a temporary session ID associated with the established session. Upon receiving the assigned session ID. IPMI agent 304 or its associated SAS expander returns a signed packet with the session ID to confirm that the assigned ID will be used for the active session. Further, IPMI agent 304 or its SAS expander can return an inbound sequence number which is assigned for remote management system 302 to be used for the active session. With assigned session ID and session sequence number, the active session can be used to transmit data between the SAS expander and remote management system 302.

According to some embodiments, remote management system 302 can, via the active session, generate and transmit a RMCP status request to IPMI agent 304. As described earlier, the RMCP status request can, conforming to the IPMI protocol, be transmitted using the Ethernet interface. According to some embodiments, the RMCP status request can be associated with a specific storage device that is identified with a unique SAS address. According to some embodiments, instead of requesting status data related to a specific SAS/SATA device, the RMCP status request can be non-specific and apply towards one or more storage devices associated with the SAS expander.

After receiving the RMCP status request, IPMI agent 304 or its associated SAS expander, can receive, via a serial peripheral interface of the SAS expander, status data related to one or more storage devices associated with the SAS expander. The serial peripheral interface can be a SAS interface, a SATA interface, or a combination thereof.

After receiving the status data, IPMI agent 304 or its SAS expander can configure a RMCP status response based at least in part on the received status data. As explained earlier, the RMCP status response conforms to formats specified by the IPMI protocol.

According to some embodiments, IPMI agent 304 or its SAS expander can determine whether a physical condition related to one or more storage device has reached a predetermined threshold, for example, a chassis temperature higher than a preferred temperature range. Consequently, IPMI agent 304 or its SAS expander can configure the RMCP status response to include an over-heat reminder for informing the system administrator about the heat exhaustion issue.

IPMI agent 304 or its SAS expander can transmit, via the Ethernet interface of the SAS expander, the RMCP status response to remote management system 302. For example, a system administrator can view the content of the RMCP status response via a user interface implemented by remote management system 302. When a critical physical data is reported, e.g., overheating in a chassis, the system administrator can take necessary actions to rectify the system's abnormities, e.g., by increasing fan speed or powering off the system.

According to some embodiments, IPMI agent 304 or its associated SAS expander can transmit status data without a RMCP request from remote management system. Such an autonomous mechanism enables a real-time monitoring of a storage systems operation.

Figure 4:
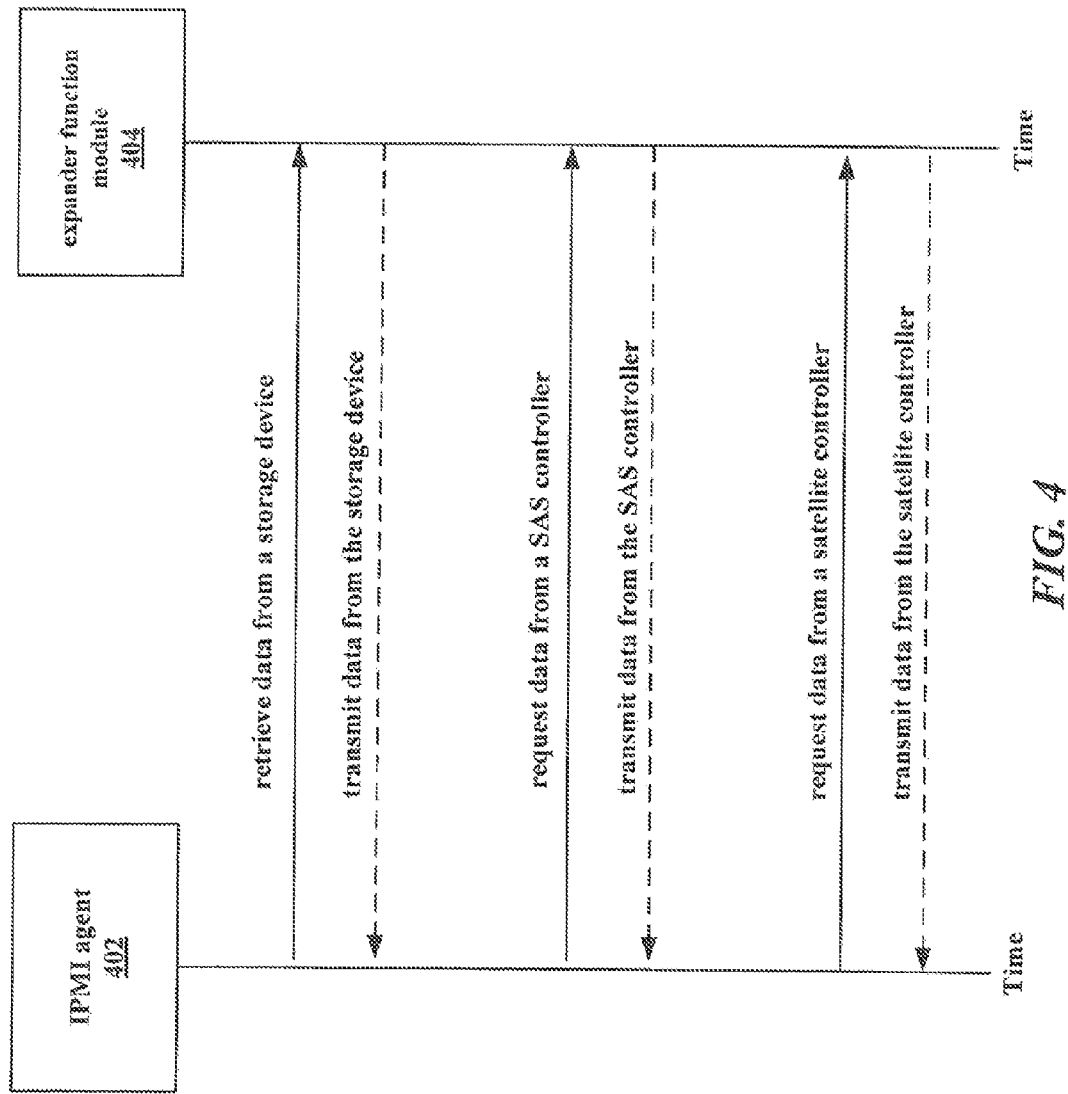
FIG. 4 is another flow diagram illustrating an example of a SAS expander management system, according to some embodiments.

FIG. 4 is another flow diagram illustrating an example of a SAS expander management system, according to some embodiments. Upon receiving the RMCP session request from remote management system 302, IMPI agent 304 is operable to communicate with expander function module 404 to retrieve and transmit the requested data from one of a data storage device, a SAS controller, or a satellite controller using a corresponding transmission protocol.

According to some embodiments, a remote management system (not shown) can generate an IPMI request (e.g., RMCP request) for data stored in a storage device and transmit it to IPMI agent 402 executing on a SAS expander via LAN. Upon receiving the IPMI request, IMPI agent 402 can communicate with expander function module 404 to obtain the requested data from the storage device. In particular, IPMI agent 402 can request the data from an IPMI service API associated with expander function module 404. The IPMI service API can request or retrieve the data from a storage device service API which is also associated with expander function module 404 and executes on the SAS expander. Examples of the requested data include sensor data or physical data of the server, including temperature data, voltage data, and Field Replaceable Unit (FRU) information data. Example of the storage device can be a non-volatile memory or storage device that is operable to store the system physical or operational data.

According to some embodiments, a remote management system can generate an IPMI request (e.g., RMCP request) for system parameter data associated with a SAS controller and transmit it to IPMI agent 402 executing on a SAS expander via LAN. Upon receiving the IPMI request, IMPI agent 402 can communicate with expander function module 404 to obtain the requested data from the storage device. In particular, IPMI agent 402 can request the system parameter data from an IPMI service API associated with expander function module 404. The IPMI service API can request or retrieve the system parameter data from a SAS controller service API which is also associated with expander function module 404 and executes on the SAS expander. Examples of the system parameter data include the corresponding storage device manufacture data such as a vender name, a model number, a serial number and size. Further, the requested system parameter data can be transmitted using SAS protocol.

According to some embodiments, a remote management system can generate an IPMI request (e.g., RMCP request) for system operational data associated with a satellite controller and transmit it to IPMI agent 402 executing on a SAS expander via LAN. Upon receiving the IPMI request, IPMI agent 402 can request the system operational data from an IPMI service API associated with expander function module 404. The IPMI service API can request or retrieve the system operational data from a satellite controller service API executing on the satellite expander operable to monitor the system's operational data. Examples of the system operational data include the temperature data, the voltage data and the FRU information data. Further, the requested system parameter data can be transmitted using Inter-Integrated Circuit (I2C) protocol.

Figure 5:
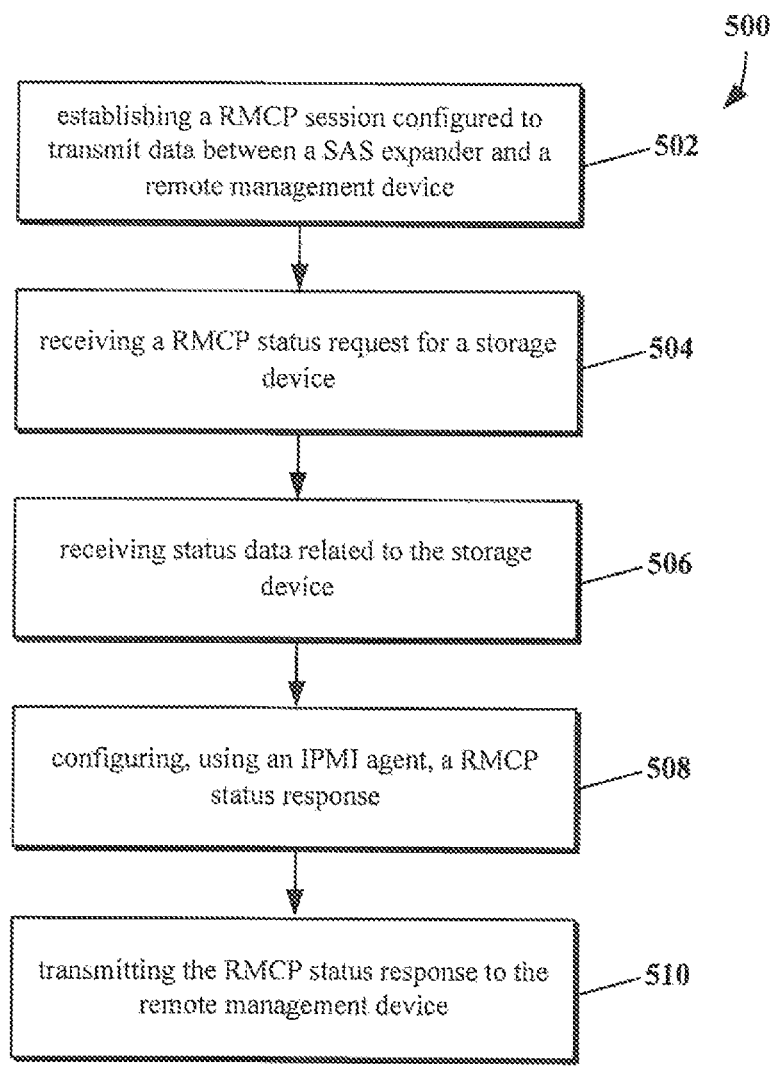
FIG. 5 is an example flow diagram for a SAS expander management system which, in response to a status data request, provides status data of a storage device, according to some embodiments.

FIG. 5 is an example flow diagram for a SAS expander management system which, in response to a status data request, provides status data of a storage device, according to some embodiments. It should be understood that there can be additional, fewer, or alternative steps performed in similar or alternative orders, or in parallel, within the scope of the various embodiments unless otherwise stated.

At step 502, the SAS expander management system establishes a RMCP session configured to transmit data between a SAS expander and a remote management device. For example, as illustrated in FIG. 3, remote management system 302 can initiate a RMCP session with IPMI agent 304 that is executed on a SAS expander. For example, an IPMI module is operable to issue a RMCP session request that conforms to the session request format specified for the IPMI protocol, e.g., a RMCP ping message. Using the IPMI protocol, the RMCP session request can be transmitted to IPMI agent 304 via an Ethernet interface.

Upon receiving the RMCP session request, IMPI agent 304 is operable to verify whether the session should be allowed or denied, by, for example, verifying identification data included in the RMCP session request. Consequently, IPMI agent 304 or its corresponding SAS expander can send a RMCP response to either allow or deny the session request. Similarly, the RMCP session response can conform to the session response format pursuant to the IPMI protocol, e.g., a RMCP pong message.

At step 504, the SAS expander management system receives a RMCP status request associated with a storage device in connection with the SAS expander. For example, remote management system 302 can, via the active session, generate and transmit a RMCP status request to IPMI agent 304. As described earlier, the RMCP status request can, conforming to the IPMI protocol, be transmitted using the Ethernet interface. According to some embodiments, the RMCP status request can be associated with a specific storage device that is identified with a unique SAS address. According to some embodiments, instead of requesting status data related to a specific SAS/SATA device, the RMCP status request can be general and apply towards any storage devices associated with the SAS expander.

At step 506, the SAS expander management system receives status data related to the storage device in connection with the SAS expander. For example, after receiving the RMCP status request, IPMI agent 304 or its associated SAS expander, can receive, via a serial peripheral interface of the SAS expander, status data related to one or more storage devices associated with the SAS expander. The serial peripheral interface can be a SAS interface, a SATA interface, or a combination thereof.

Status data includes temperature data of the CPU and chassis, fan speed data, system voltage data, state data of the physical disk and LED status data. Various sensors, e.g., thermometers, power meters can receive the status data. According to some embodiments, status data can be either associated with a specific storage device or associated with a plurality of storage devices.

At step 508, the SAS expander management system configures, using an IPMI agent, a RMCP status response based at least in part on the received status data. For example, IPMI agent 304 or its SAS expander can configure a RMCP status response based at least in part on the received status data. As explained earlier, the RMCP status response conforms to formats specified by the IPMI protocol.

At step 510, the SAS expander management system transmits the RMCP status response to the remote management. For example, IPMI agent 304 or its SAS expander can transmit, via the Ethernet interface of the SAS expander, the RMCP status response to remote management system 302.

According to some embodiments, IPMI agent 304 or its SAS expander can determine whether a physical condition related to one or more storage devices has reached a predetermined threshold, for example, a chassis temperature higher than a preferred temperature range. Consequently, IPMI agent 304 or its SAS expander can configure the RMCP status response to include an over-heat reminder for informing the system administrator about the heat exhaustion issue. Alternatively, remote management system 302 can determine that the overheating by analyzing the status data and generate a reminder to the administrator. Accordingly, the system administrator can take appropriate actions to tackle the accumulated heat, e.g. by increasing a fan speed.

Figure 6:
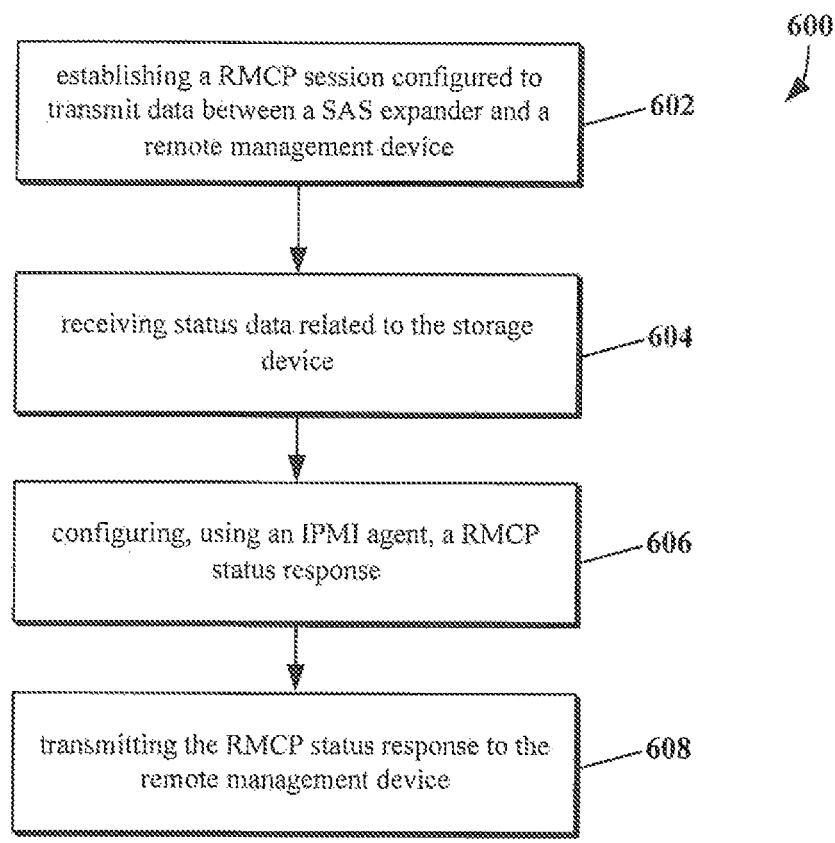
FIG. 6 is another example flow diagram for a SAS expander management system which autonomously provides status data of a storage device, according to some embodiments.

FIG. 6 is another example flow diagram for a SAS expander management system which autonomously provides status data of a storage device, according to some embodiments. It should be understood that there can be additional, fewer, or alternative steps performed in similar or alternative orders, or in parallel, within the scope of the various embodiments unless otherwise stated.

At step 602, the SAS expander management system establishes a RMCP session configured to transmit data between a SAS expander and a remote management device. For example, as illustrated in FIG. 3, remote management system 302 can initiate a RMCP session with IPMI agent 304 that is executed on a SAS expander. Upon receiving the RMCP session request, IMPI agent 304 is operable to verify whether the session should be allowed or denied, by, for example, verifying identification data included in the RMCP session request. Consequently, IPMI agent 304 or its corresponding SAS expander can send a RMCP response to either allow or deny the session request. Similarly, the RMCP session response can conform to the session response format pursuant to the IPMI protocol, e.g., a RMCP pong message.

At step 604, the SAS expander management system receives status data related to the storage device in connection with the SAS expander. For example, IPMI agent 304 or its associated SAS expander, can receive, via a serial peripheral interface of the SAS expander, status data related to one or more storage devices associated with the SAS expander. The serial peripheral interface can be a SAS interface, a SATA interface, or a combination thereof. According to some embodiments, the received status data can be real-time and continuous. According to some embodiments, the received status data can be selective, meaning that the data is only collected and transmit to the SAS expander when it reaches a predetermined threshold. For example, a reading of the power meter indicates that a power level is below a preferred range.

At step 606, the SAS expander management system configures, using an IPMI agent, a RMCP status response based at least in part on the received status data. For example, IPMI agent 304 or its SAS expander can configure a RMCP status response based at least in part on the received status data. As explained earlier, the RMCP status response conforms to formats specified by the IPMI protocol.

According to some embodiments, IPMI agent 304 or its SAS expander can determine whether a physical condition related to one or more storage devices has reached a predetermined threshold, for example, a power level of the storage device is below the threshold level. Consequently, IPMI agent 304 or its SAS expander can configure the RMCP status response to include a low-power reminder for informing the system administrator about the insufficient power issue. Accordingly, the system administrator can take actions to increase the power level of the storage system.

At step 608, the SAS expander management system transmits the RMCP status response to the remote management. For example, IPMI agent 304 or its SAS expander can transmit, via the Ethernet interface of the SAS expander, the RMCP status response to remote management system 302. According to some embodiments, IPMI agent 304 or its SAS expander can determine whether a physical condition related to one or more storage devices has reached a predetermined threshold, for example, a power level below a preferred range. Consequently, IPMI agent 304 or its SAS expander can configure the RMCP status response to include a low-power reminder for informing the system administrator about the power issue. Alternatively, remote management system 302 can determine that the low-power issue by analyzing the status data and generate a reminder to the administrator. Accordingly, the system administrator can take appropriate actions to improve the power level and maintain system performance.

Figure 7:
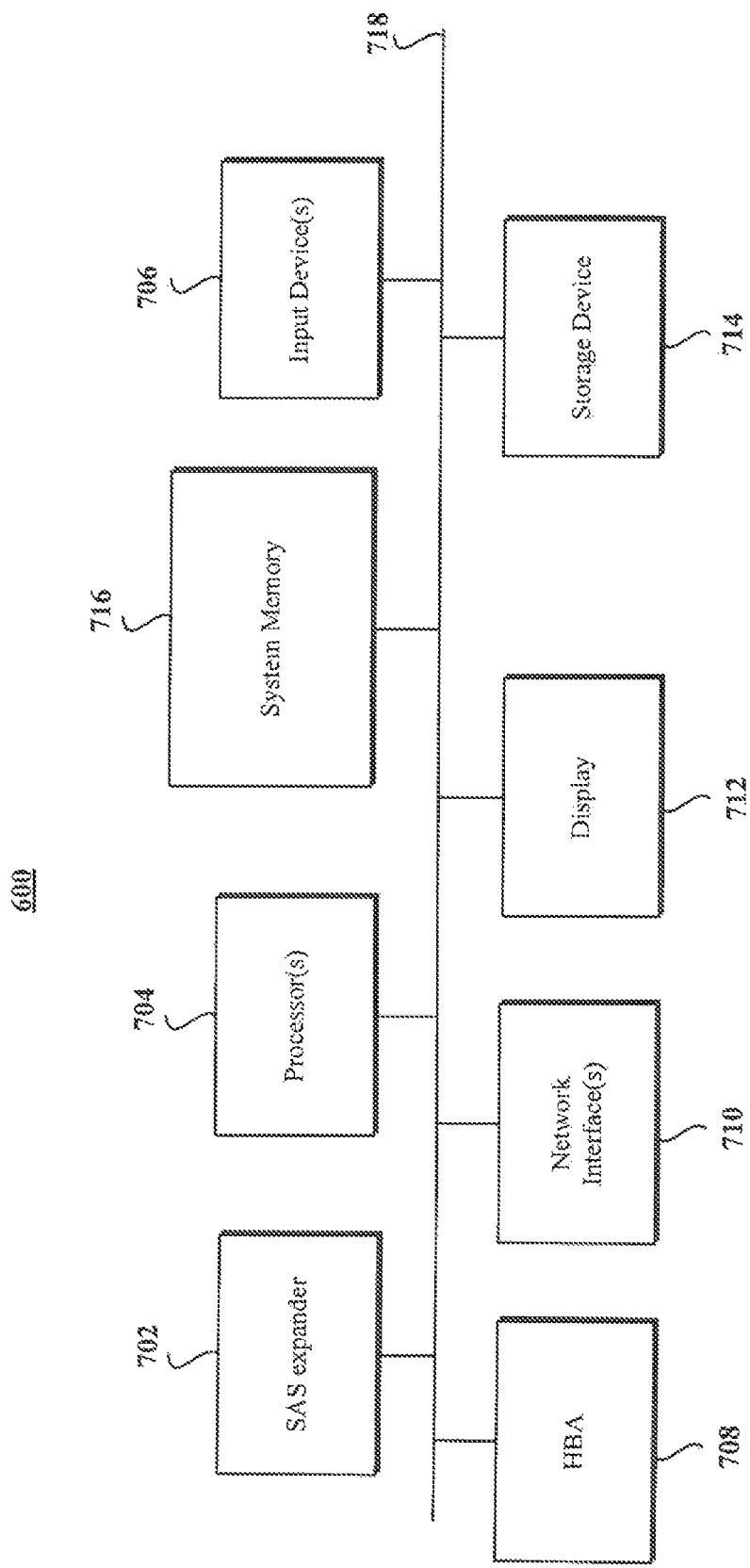
FIG. 7 illustrates a computing platform of a computing device, according to some embodiments.

FIG. 7 illustrates an example system architecture 700 for implementing the systems and processes of FIGS. 1-6. Computing platform 700 includes a bus 718 which interconnects subsystems and devices, such as: SAS expander 702, processor 704, storage device 714, system memory 716, a network interface(s) 710, and a controller such as HBA 708. Processor 704 can be implemented with one or more central processing units ("CPUs"), such as those manufactured by Intel® Corporation—or one or more virtual processors—as well as any combination of CPUs and virtual processors. Computing platform 700 exchanges data representing inputs and outputs via input-and-output devices input devices 706 and display 712, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 700 performs specific operations by processor 704, executing one or more sequences of one or more instructions stored in system memory 716. Computing platform 700 can be implemented as a server device or client device in a client-server arrangement, peer-to-peer arrangement, or as any mobile computing device, including smart phones and the like. Such instructions or data may be read into system memory 716 from another computer readable medium, such as storage device 714. In some examples, hard-wired circuitry may be used in place of or in combination with software instructions for implementation. Instructions may be embedded in software or firmware. The term "computer readable medium" refers to any tangible medium that participates in providing instructions to processor 704 for execution. Such a medium may take many forms, including, but not limited to, non-volatile media and volatile media. Non-volatile media includes, for example, optical or magnetic disks and the like. Volatile media includes dynamic memory, such as system memory 716.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 718 for transmitting a computer data signal.

In the example shown, system memory 716 can include various modules that include executable instructions to implement functionalities described herein. In the example shown, system memory 716 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
   establishing, at a serial attached small computer system interface (SAS) expander associated with a plurality of storage devices, a remote management control protocol (RMCP) session configured to transmit data between the SAS expander and a remote management device;
   receiving, via a network interface of the SAS expander, a RMCP status request for at least one storage device associated with the SAS expander;
   receiving, via a serial peripheral interface of the SAS expander, status data related to the at least one storage device of the plurality of storage devices;
   configuring, using an intelligent platform management interface (IPMI) agent executing on the SAS expander, a RMCP status response based at least in part on the status data related to the at least one storage device; and
   transmitting, via the network interface of the SAS expander, the RMCP status response to the remote management device.

2. The computer-implemented method of claim 1, further comprising:
   receiving, via the network interface of the SAS expander, a RMCP session request from the remote management device; and
   transmitting, via the network interface of the SAS expander, a RMCP session response to the remote management device.

3. The computer-implemented method of claim 1, further comprising:
   receiving, via the network interface of the SAS expander, an identification request from the remote management device;
   assigning an identification number to the RMCP session; and
   transmitting the identification number to the remote management device.

4. The computer-implemented method of claim 1, wherein the serial peripheral interface of the SAS expander is an attached small computer system interface (SAS) interface.

5. The computer-implemented method of claim 1, wherein the serial peripheral interface of the SAS expander is a serial advanced technology attachment (SATA) interface.

6. The computer-implemented method of claim 1, wherein the at least one device comprises one of an attached small computer system interface (SAS) storage device or a serial advanced technology attachment (SATA) storage device.

7. The computer-implemented method of claim 1, wherein the status data comprises at least one of system operational data or system parameter data associated with the at least one device.

8. The computer-implemented method of claim 1, wherein the network interface is an Ethernet interface.

9. A system, comprising:
a processor; and
a memory device including instructions that, when executed by the processor, cause the processor to perform operations comprising:
establishing, at a serial attached small computer system interface (SAS) expander associated with a plurality of storage devices, a remote management control protocol (RMCP) session configured to transmit data between the SAS expander and a remote management device;
receiving, via a serial peripheral interface of the SAS expander, status data related to the at least one storage device of the plurality of storage devices, the status data comprising at least one of temperature data, power data, and fan speed data of the at least one device;
configuring, using an intelligent platform management interface (IPMI) agent executing on the SAS expander, a RMCP status message based at least in part on the status data related to the at least one storage device; and
transmitting, via an Ethernet interface of the SAS expander, the RMCP status message to the remote management device.

10. The system of claim 9, further comprising:
receiving, via the Ethernet interface of the SAS expander, a RMCP session request from the remote management device; and
transmitting, via the Ethernet interface of the SAS expander, a RMCP session response to the remote management device.

11. The system of claim 9, further comprising:
receiving, via the Ethernet interface of the SAS expander, an identification request from the remote management device;
assigning an identification number to the RMCP session; and
transmitting the identification number to the remote management device.

12. The system of claim 9, wherein the serial peripheral interface of the SAS expander is an attached small computer system interface (SAS) interface.

13. The system of claim 9, wherein the serial peripheral interface of the SAS expander is a serial advanced technology attachment (SATA) interface.

14. The system of claim 9, wherein the at least one device comprises one of an attached small computer system interface (SAS) storage device or a serial advanced technology attachment (SATA) storage device.

15. A non-transitory computer-readable storage medium storing instructions which, when executed by a processor, cause the processor to perform operations comprising:
establishing, at a serial attached small computer system interface (SAS) expander associated with a plurality of storage devices, a remote management control protocol (RMCP) session configured to transmit data between the SAS expander and a remote management device;
receiving, via a serial peripheral interface of the SAS expander, status data related to the at least one storage device of the plurality of storage devices, the status data comprising at least one of temperature data, power data, and fan speed data of the at least one device;
configuring, using an intelligent platform management interface (IPMI) agent executing on the SAS expander, a RMCP status message based at least in part on the status data related to the at least one storage device; and
transmitting, via an Ethernet interface of the SAS expander, the RMCP status message to the remote management device.

16. The non-transitory computer-readable storage medium of claim 15, wherein the non-transitory computer-readable storage medium stores further instructions which, when executed by the processor, cause the processor to perform operations further comprising:
receiving, via the Ethernet interface of the SAS expander, a RMCP session request from the remote management device; and
transmitting, via the Ethernet interface of the SAS expander, a RMCP session response to the remote management device.

17. The non-transitory computer-readable storage medium of claim 15, wherein the non-transitory computer-readable storage medium stores further instructions which, when executed by the processor, cause the processor to perform operations further comprising:
receiving, via the Ethernet interface of the SAS expander, an identification request from the remote management device;
assigning an identification number to the RMCP session; and
transmitting the identification number to the remote management device.

18. The non-transitory computer-readable storage medium of claim 15, wherein the serial peripheral interface of the SAS expander is an attached small computer system interface (SAS) interface.

19. The non-transitory computer-readable storage medium of claim 15, wherein the serial peripheral interface of the SAS expander is a serial advanced technology attachment (SATA) interface.

20. The non-transitory computer-readable storage medium of claim 15, wherein the at least one device comprises one of an attached small computer system interface (SAS) storage device or a serial advanced technology attachment (SATA) storage device.

* * * * *